Nov. 8, 1966

L. L. CHARLSON 3,283,723

ROTARY FLUID PRESSURE DEVICES

Filed July 9, 1965

INVENTOR.
LYNN L. CHARLSON
BY
Wayne B. Easton
ATTORNEY

Nov. 8, 1966

L. L. CHARLSON 3,283,723

ROTARY FLUID PRESSURE DEVICES

Filed July 9, 1965

INVENTOR.
LYNN L. CHARLSON
BY
Wayne B. Easton
ATTORNEY

Nov. 8, 1966 — L. L. CHARLSON — 3,283,723
ROTARY FLUID PRESSURE DEVICES
Filed July 9, 1965 — 7 Sheets-Sheet 4

INVENTOR.
LYNN L. CHARLSON
BY
Wayne B. Easton
ATTORNEY

Nov. 8, 1966

L. L. CHARLSON 3,283,723

ROTARY FLUID PRESSURE DEVICES

Filed July 9, 1965

INVENTOR.
LYNN L. CHARLSON
BY
Wayne B. Easton
ATTORNEY

Nov. 8, 1966 L. L. CHARLSON 3,283,723
ROTARY FLUID PRESSURE DEVICES

Filed July 9, 1965 7 Sheets-Sheet 6

INVENTOR.
LYNN L. CHARLSON
BY
Wayne B. Easton
ATTORNEY

United States Patent Office 3,283,723
Patented Nov. 8, 1966

3,283,723
ROTARY FLUID PRESSURE DEVICES
Lynn L. Charlson, Minneapolis, Minn., assignor to Germane Corporation, Minneapolis, Minn., a corporation of Minnesota
Filed July 9, 1965, Ser. No. 470,746
11 Claims. (Cl. 103—130)

This invention relates generally to fluid pressure devices of the type having a gear reduction mechanism known in the art as a gerotor which forms expansible and contractible chambers.

A main object of the invention is to provide new and improved gerotor type fluid pressure devices which have the functions of a flow divider, a flow integrator, and a pressure booster or intensifier.

Other objects and advantages will become apparent from the following specification, appended claims and attached drawings.

Figure 1:
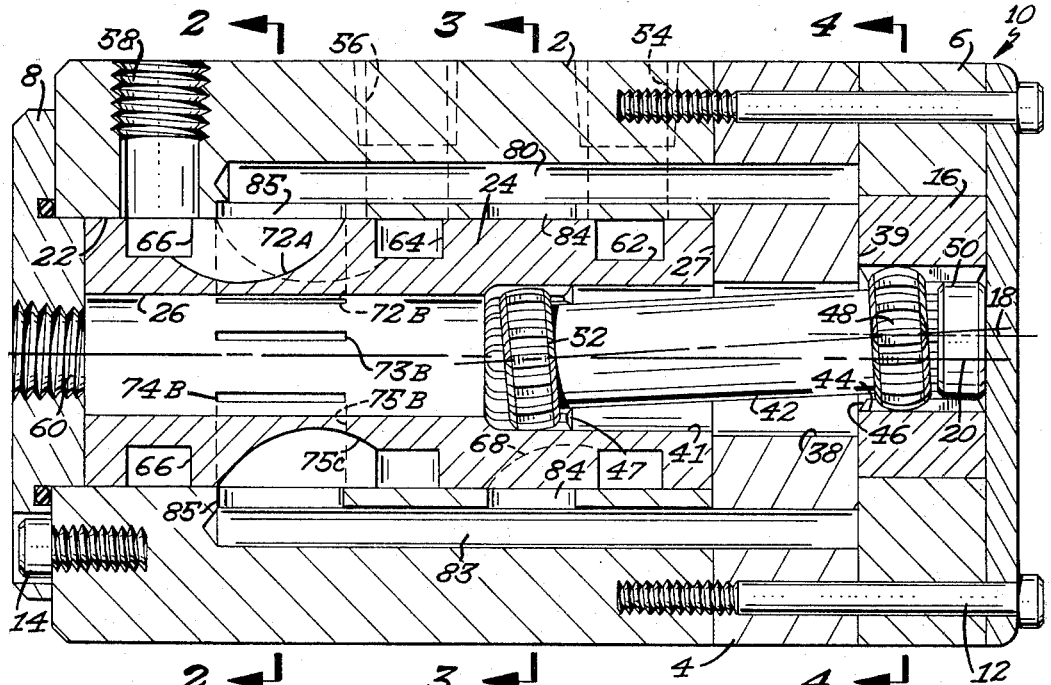
FIG. 1 is a longitudinal sectional view of a fluid pressure device embodying the invention taken on line 1—1 of FIG. 2.

The embodiment of the invention illustrated in FIGS. 1 to 4 is a gerotor type fluid pressure device having a casing or housing made of several cylindrically and annularly shaped sections which are a valve casing section 2, an intermediate casing section 4, a gerotor casing section 6 and end plates 8 and 10. Casing sections 2, 4 and 6 and end plate 10 are held together in axial alignment by a plurality of circumferentially spaced bolts 12. End plate 8 is attached to casing section 2 by a plurality of circumferentially spaced bolts 14.

The shape of gerotor casing section 6 is generally cylindrical and annular and has a plurality of internal teeth which will be referred to in detail further on. An externally toothed star member 16 having at least one fewer teeth than casing section 6, which may be referred to as a ring member 6, has the teeth thereof in meshing engagement with the teeth of ring member 6. Star member 16 partakes of a hypocycloidal movement so that the axis 18 of star member 16 travels in an orbit about the axis 20 of ring member 6.

Casing section 2 has a bore 22 and rotatably disposed and supported in bore 22 is cylindrically shaped commutator valve 24 which has a bore 26. Valve 24 is disposed so that the left end thereof is in abutting engagement with end plate 8 and the right end thereof is in abutting engagement with an annular face 27 of casing section 4.

Figure 4:
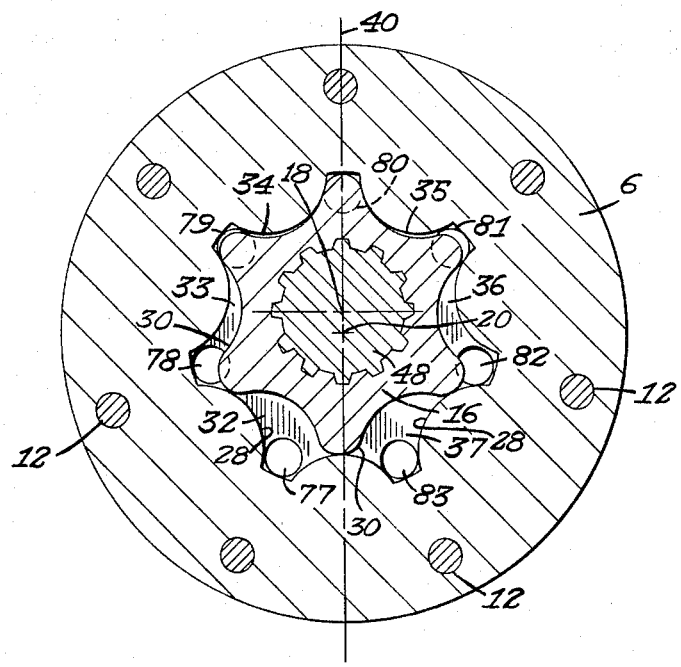
FIG. 4 is a transverse sectional view taken on line 4—4 of FIG. 1.

With reference to FIGS. 1 and 4, the gerotor casing section 6, which in effect is the ring member 6, has a plurality of internal teeth 28. Externally toothed star member 16, having at least one fewer teeth 30 than ring member 6, is disposed eccentrically in the chamber or space formed and surrounded by ring member 6. Star member 16 is moveable orbitally relative to the ring member 6 with the axis 18 of star member 16 being moveable in an orbital path about the axis 20 of ring member 6. During orbital movement of star member 16 the teeth 30 thereof intermesh with the ring member teeth 28 to form expanding and contracting cells 32 to 37 which are equal in number to the number of teeth 30 of star member 16. Casing section 4 has a bore 38 which is concentric relative to ring axis 20 and is of small enough diameter so that the resulting annular face 39 which abuts gerotor casing section 6, along with cover plate 10, form sides for the gerotor chamber so that the expanding and contracting cells 32 to 37 formed between the teeth of the gerotor star and ring members 16 and 6 will be closed for all orbital positions of the star member 16.

With further reference to FIG. 4, a vertical centerline 40 incidentally represents the line of eccentricity for the star member 16 for that particular position of the star member relative to the ring member 6. The line of eccentricity is defined herein as a line which is perpendicular to and intersects the star and ring axes 18 and 20 for all orbital positions of the star 16. During orbital movement of the star member 16, assuming the orbital movement is clockwise, the cells 32 to 34 on the left side of the line of eccentricity would be expanding and the cells 35 to 37 on the right side would be contracting. In the operation of the device illustrated, fluid under pressure is directed to the expanding cells on the left side of the line of eccentricity and exhausted from the contracting cells on the right side of said line. The valving arrangement which facilitates the feeding and exhausting of the cells 32 to 37 will be described further on herein.

Commutating valve 24 has a counterbore 41. A shaft 42, which may be referred to as a dogbone because of its general appearance, extends into valve counterbore 41 and mechanically connects star 16 and commutator valve 24 in driving relation. Star member 16 has a bore 44 which is concentric relative to the teeth 30 thereof and the bore 44 is provided with a plurality of circumferentially arranged, axially extending teeth or splines 46. The inner end of valve counterbore 41 is provided with a plurality of circumferentially arranged, axially extending teeth or splines 47. Shaft 42 has an enlarged head 48 at the star end thereof which has a frustospherically shaped portion and is provided with splines which are equal in number to and mesh with splines 46 of the star 16. A spacer spool 50 is disposed in star bore 44 in closely spaced relation to shaft head 48 and end plate 10. The other end of dogbone 42 has an enlarged head 52 with a frustospherically shaped portion and is provided with splines which are equal in number to and mesh with splines 47 of the valve 24.

The ratio between the orbiting and rotating speeds of the star is dependent upon the ratio between the ring and star member teeth. If that ratio is seven to six as illustrated herein, the rotating speed of the star will be one-sixth of its orbiting speed. Valve 24 is a commutating type valve in that it rotates at the same speed that star 16 rotates but it functions to supply and exhaust fluid to and from the gerotor at the orbiting frequency of the star.

Thus far only the mechanical aspects of the device have been referred to and the fluid flow passages and valving will now be described.

It is a characteristic of the device that it has one fluid inlet port and at least two fluid outlet ports. In the embodiment of the invention illustrated in FIGS. 1 to 4 there is provided one fluid inlet port and three fluid outlet ports. A fluid inlet port 54 and two fluid outlet ports 56 and 58 are provided in casing section 2, each of which ports extend through casing section 2 and open into the bore 22. A third fluid outlet port 60 is provided in end plate 8 which is concentric with the axis 20 and has fluid communication with bore 26 of commutator valve 24.

Figure 3:
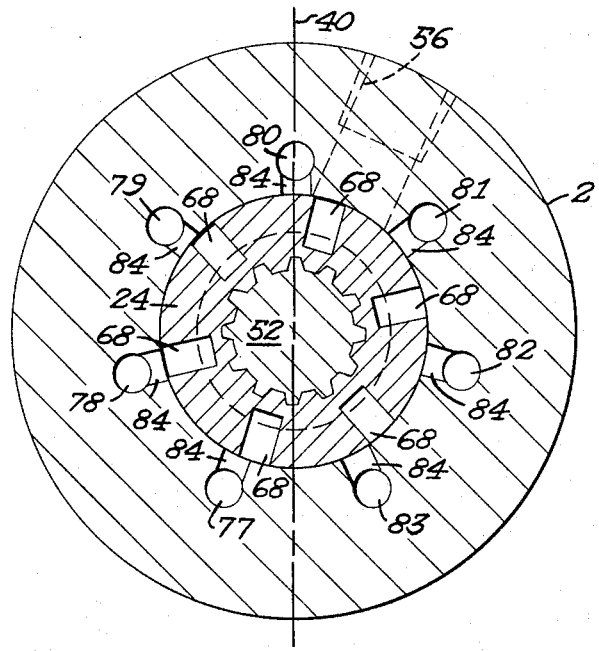
FIG. 3 is a transverse sectional view taken on line 3—3 of FIG. 1.

Commutator valve 24 and casing sections 2 and 4 are provided with fluid passage means through which fluid is conveyed from the inlet port 54 to the expanding cells 32 to 34 of the gerotor and through which fluid being hausted from the collapsing cells 35 to 37 of the gerotor is caused to be divided and flow out of all of the outlet ports 56, 58 and 60. Valve 24 has three axially spaced annular channels 62, 64 and 66 which are axially aligned and in constant fluid communication respectively with fluid inlet port 54 and fluid outlet ports 56 and 58 in casing section 2. With reference to FIGS. 1 and 3, valve 24 has a plurality of axially extending, circumferentially arranged and spaced fluid inlet passages which are illustrated herein as a set of six grooves 68 in the cylindrical surface of valve 24 which are in constant fluid communication with annular channel 62 and inlet port 54.

Valve 24 is also provided with sets of exhaust passages which are illustrated herein as being six sets of passages 70 to 75 which are equal in number to the number of teeth on the star 16. The sets 70 to 75 are in circumferentially spaced relation and are alternately spaced circumferentially relative to passages 68. The alternate spacing of the inlet passages 68 relative to the sets of exhaust passages 70 to 75 may be noted by comparing the sections shown in FIGS. 2 and 3 of the drawings. Each of the sets 70 to 75 in valve 24 comprises three passages A, B and C. The passage sets 70 to 75 and the passages A, B and C thereof are in general axial alignment relative to the axis 20.

Passages A extend axially and are in circumferentially spaced relation. Passages A are illustrated as grooves which intersect annular channel 66 and are in constant fluid communication with annular channel 66 and outlet port 58.

Passages B extend axially and are in circumferentially spaced relation. Passages B are illustrated as slots which extend radially through commutator valve 24 and are in fluid communication with the outlet port 60 through bore 26 of the valve 24.

Passages C extend axially and are in circumferentially spaced relation. Passages C are illustrated as grooves which intersect annular channel 64 and are in constant fluid communication with annular channel 64 and fluid outlet port 56.

Casing sections 2 and 4 have formed jointly therein a plurality of generally axially extending, circumferentially arranged and spaced passages 77 to 83 (see FIGS. 1, 2, 3, and 4) illustrated as being seven in number which is equal to the number of teeth 28 of the ring member 6. The passages 77 to 83 extend axially from points between the ring member teeth 28 in the chamber formed by the ring member 6 through casing sections 4 and 2. Casing section 2 has a total of fourteen slots which extend radially from passages 77 to 83 to casing bore 22 which provides each one of the passages 77 to 83 with two outlets to the casing bore 22. One set 84 of said slots is axially aligned with the fluid inlet ports 68 in valve 24 and another set 85 of said slots is axially aligned with the passage sets 70 to 75.

Valve 24, by reason of the dogbone connection between it and star 16, will rotate at the same speed as star 16 but in the opposite direction from the orbiting direction of the star 16. Upon rotation of valve 24, (1) the passages 68 of valve 24 register successively in fluid communication with the passages 77 to 83 in casing section 2 through radial slots 84 and (2) passages A, B and C of the passage sets 70 to 75 register successively in fluid communication with the passages 77 to 83 in casing section 2 through radial slots 85.

In the operation of the device, pressurized fluid is introduced through inlet port 54 from where it flows into annular channel 62 into inlet passages 68 in valve 24, through radial slots 84 in casing section 2 on the left side of the line of eccentricity 40 as viewed in FIG. 4, through passages 77 to 79 in casing sections 2 and 4 on the left side of the line of eccentricity 40 (as viewed in FIG. 3) to gerotor cells 32 to 34 which, as viewed in FIG. 4 are on the left side of the line of eccentricity 40. The expansion of the cells 32 to 34 on the left side of the line of eccentricity 40 causes star 16 to orbit in a clockwise direction and cause collapsing of the cells 35 to 37 on the right side of the line of eccentricity 40. Fluid from the collapsing cells 35 to 37 flows through casing passages 81 to 83 on the right side of the line of eccentricity 40, as viewed in FIGS. 2, 3 and 4, through radial slots 85 on the right side of the line of eccentricity as viewed in FIGS. 2, to the interior of valve bore 22 where it has fluid communication with fluid exhaust passage sets 73 to 75 on the right side of the line of eccentricity 40 as viewed in FIG. 2.

The above description of fluid flow is only for an instantaneous condition in that the line of eccentricity 40 rotates about the axis 20 of ring member 6 at the orbiting speed of star 16 and it is only in the position illustrated for an instant during each rotation thereof about axis 20. As long as pressurized fluid is admitted through inlet port 54, however, the pressurized fluid will always be admitted to cells on the same side of the line of eccentricity 40, regardless of the angular position of said line, and fluid will always be exhausted from cells on the other side of said line.

Considering any cell 32 to 37 individually, such as cell 33, for example, pressurized fluid is first admitted through passage 78 to cause the cell 33 to expand and subsequently, when cell 33 collapses, fluid is forced out of cell 33 through the same passage 78 through which the fluid was admitted to the cell 33.

Figure 2:
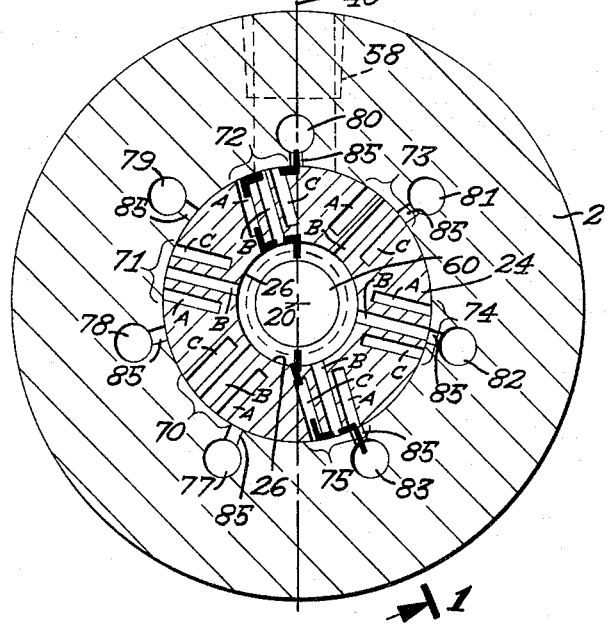
FIG. 2 is a transverse sectional view taken on line 2—2 of FIG. 1.

At the instant when valve 24 is in the position illustrated, it may be noted from FIG. 2 that (1) fluid from cell 35 is being exhausted through passage 81, through valve passage 73C, through annular channel 64 and out fluid outlet port 56, (2) fluid from cell 36 is being exhausted through passage 82, through valve passage 74B into valve bore 26 and out fluid outlet port 60, and (3) fluid from cell 37 is being exhausted through passage 83, through valve passage 75A, through annular channel 66 and out fluid outlet port 58. Thus, it will be noted that at that instant each of the cells 35 to 37 is being exhausted to a different outlet port. Different conditions prevail for other positions of star 16 and valve 24 but at any instant there are always three cells on the exhaust side of the line of eccentricity 40 that are respectively exhausting fluid to the three outlet ports 56, 58 and 60.

When the valve 24 has advanced a few degrees in a counterclockwise direction from the position shown in FIG. 2, the instantaneous flow conditions are such that (1) fluid from cell 36 will be exhausted through passage 82, through valve passage 74C, through annular channel 64 and out fluid outlet port 56, (2) fluid from cell 37 will be exhausted through passage 75B into valve bore 26 and out fluid outlet port 60, and (3) fluid from cell 32 will be exhausted through passage 77, through valve passage 70A through annular channel 66 and out fluid outlet port 58.

A comparison of the three instantaneous conditions reveals that the exhaust from a single cell is divided as the cell collapses such that during the first one-third of the collapsing cycle the cell will exhaust through one outlet port, that during the second one-third of the collapsing cycle the cell will exhaust through a second outlet port, and that during the final one-third of the collapsing cycle the cell will exhaust to a third outlet port. This characteristic of the device may be surmised from the above comparison where during one collapsing cycle cell 37 discharges firstly to outlet port 58 through valve passage 75A, secondly to outlet port 60 through valve passage 75B, and thirdly to outlet port 56 through valve passage 75C.

In the embodiment of the invention illustrated in FIGS. 1 to 4 an overlapping of ports is provided whereby the circumferential width of each slot 85 is slightly larger than the spaces that separate the passages A, B and C of each passage set 70 to 75. During operation each cell successively communicates with passages A, B and C of each passage set 70 to 75 during its exhausting cycle and, to avoid a binding action whereby a collapsing cell would not have an outlet to exhaust to and fluid would be momentarily trapped in the cell, the overlapping referred to is provided whereby a connection between a cell and a passage A is not completely concluded until there is a connection between the cell and the adjacent passage B. Likewise, the connection between the cell and the passage B is not completely concluded until there is a connection between the cell and the adjacent passage C.

From the above description it may be observed that the device operates as a flow divider in that one stream of fluid admitted through inlet port 54 is caused to be divided and exhausted from the device through three outlet ports 56, 58 and 60. In addition to functioning as a flow divider the device can also function as a pressure intensifier or pressure multiplier. To permit an understanding of this function it should first be observed that pressurized fluid fed to the three expanding cells 32 to 34 is effective over an area which corresponds to the diameter of the star 16 to move the star in its orbital path and thereby force the fluid out of the contracting cells 35 to 37. In the embodiment illustrated in FIGS. 1 to 4 the fluid exhausted from individual cells is directed to three different fluid outlets. With star 16 and commutator valve 24 in the positions shown in FIGS. 2 and 4, for example, it will be noted that cell 35 is exhausting through outlet port 56, cell 36 is being exhausted through outlet port 60, and cell 37 is being exhausted through outlet port 58. If two of the fluid outlets such as outlets 58 and 60 were connected to a drain reservoir with no resistance being offered to the flow of fluid out of outlets 58 and 60, the total resultant force of the pressurized fluid in expanding cells 32 to 34 would be concentrated on forcing the fluid out of contracting cell 35 through fluid outlet 56. Fluid outlet 56 must of course be connected to some type of energy absorbing device such as a hydraulic motor which offers resistance to the flow of fluid from fluid outlet 56 so that pressure can be developed in gerotor cell 35. As a pressure intensifier or multiplier the pressure increase realized in a single cell such as cell 35 would be considerably higher than the pressure of the fluid admitted to the fluid inlet 54.

The device may also be used as a fluid flow integrator whereby fluid admitted through fluid outlet ports 56, 58 and 60 will be integrated and flow out of inlet port 54. The device may also be used as a pump or motor if a power shaft is provided in driving relation relative to the dogbone shaft 42 and in such cases the characteristics of the device as described above may be utilized in various ways as will be obvious to those skilled in this art.

The second embodiment of the invention illustrated in FIGS. 5 to 10 is also a gerotor type fluid pressure device. Such device has a casing or housing made of several cylindrically and annularly shaped sections which are a valve casing section 102, a gerotor casing section 104 and end plate 108 and 110. Casing sections 102 and 104 and end plate 110 are held together in axial alignment by a plurality of circumferentially spaced bolts 112. End plate 108 is attached to casing section 102 by a plurality of circumferentially spaced bolts 114.

The shape of gerotor casing section 104 is generally cylindrical and annular and has a plurality of internal teeth. An externally toothed star member 116 having at least one fewer teeth than casing section 104, which may be referred to as a ring member 104, has the teeth thereof in meshing engagement with the teeth of ring member 104. Star member 116 partakes of a hypocycloidal movement so that the axis 118 of star member 116 travels in an orbit about the axis 120 of ring member 104.

Casing section 102 has a bore 122 and rotatably disposed and supported in bore 122 is cylindrically shaped commutator valve 124 which has an open bore 125 on the left side thereof and an open bore 126 on the right side thereof. Valve 124 is disposed so that the left end thereof is in abutting engagement with end plate 108 and the right end thereof is in abutting engagement with star 116.

Figure 5:
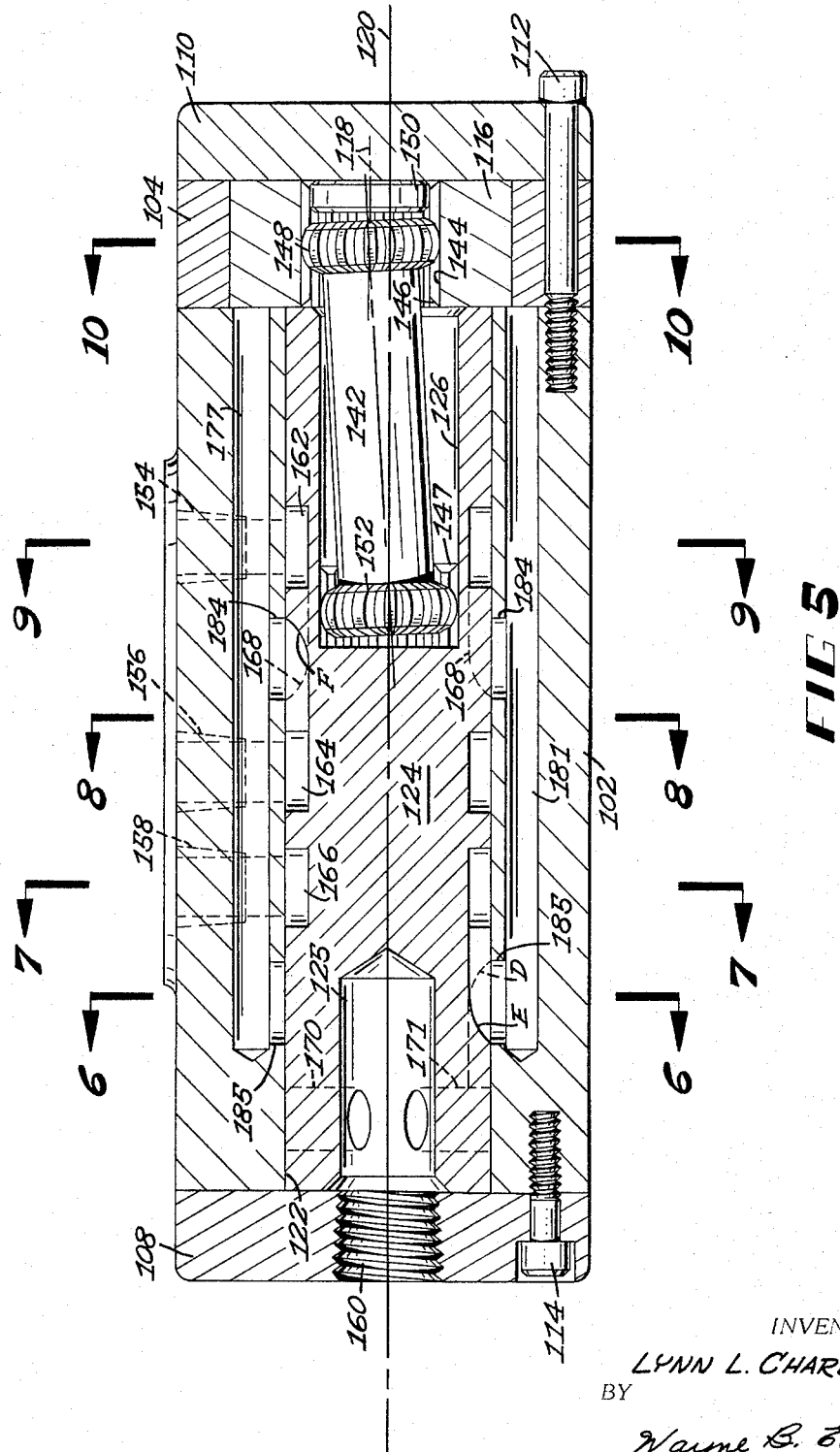
FIG. 5 is a longitudinal sectional view of a fluid pressure device taken on line 5—5 of FIG. 6 which represents a second embodiment of the invention.
Figure 10:
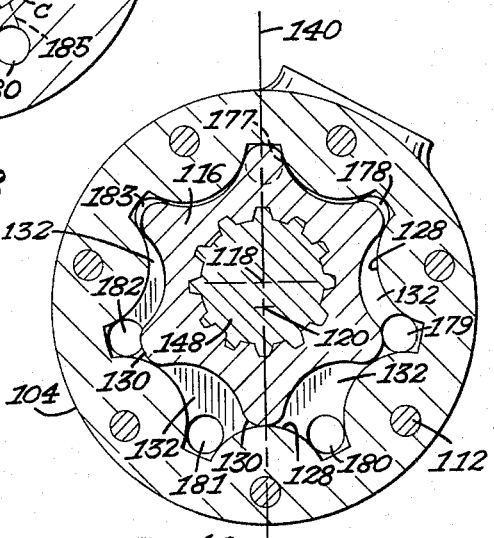
FIG. 10 is a transverse sectional view taken on line 10—10 of FIG. 5.
Figure 11:
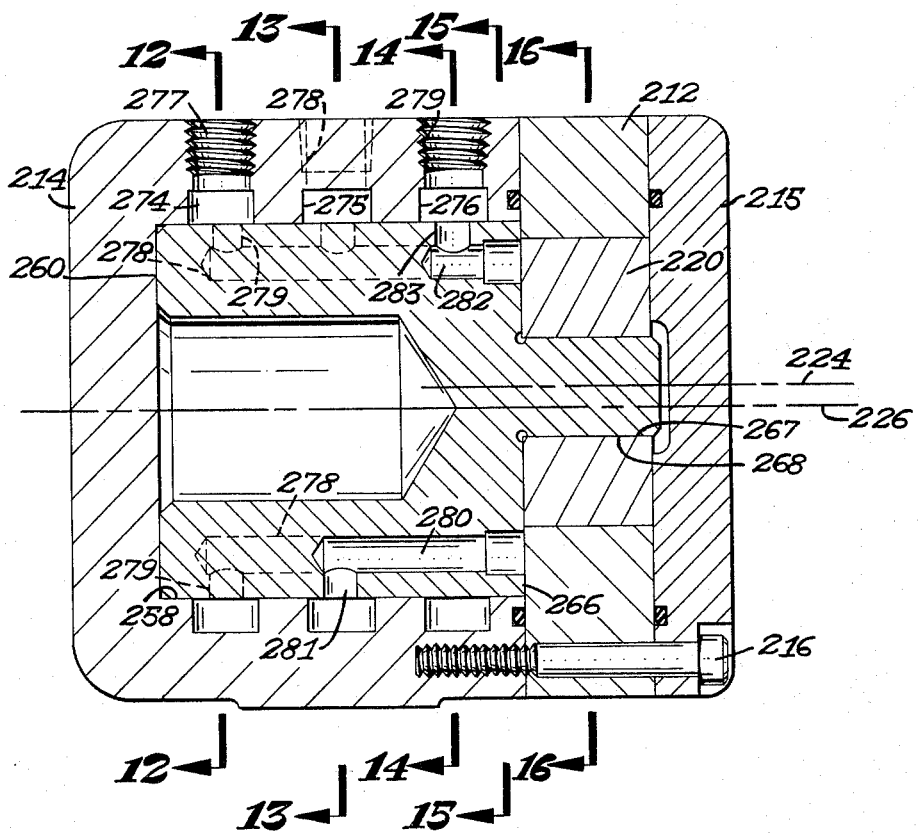
FIG. 11 is a longitudinal sectional view of a fluid pressure device taken on line 11—11 of FIG. 15 which represents the third embodiment of the invention.
Figure 12:
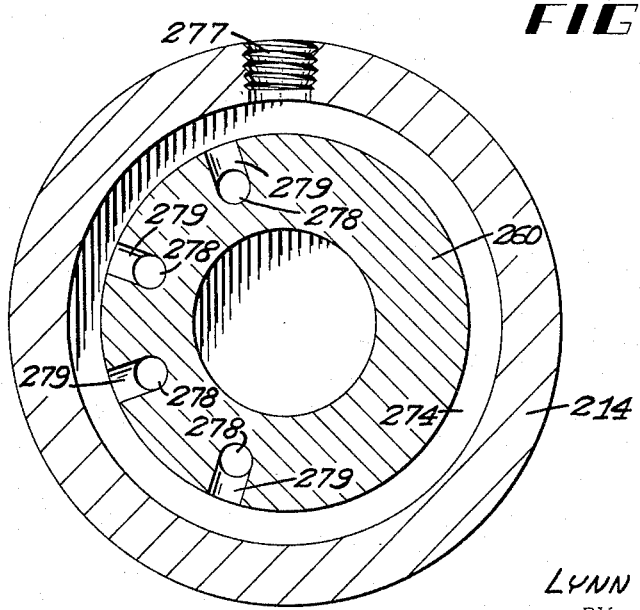
FIG. 12 is a transverse sectional view taken on line 12—12 of FIG. 11.
Figure 13:
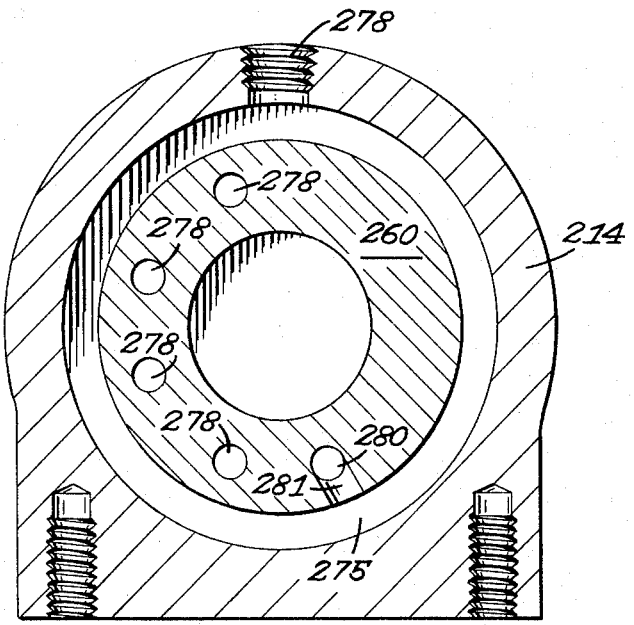
FIG. 13 is a transverse sectional view taken on line 13—13 of FIG. 11.
Figure 14:
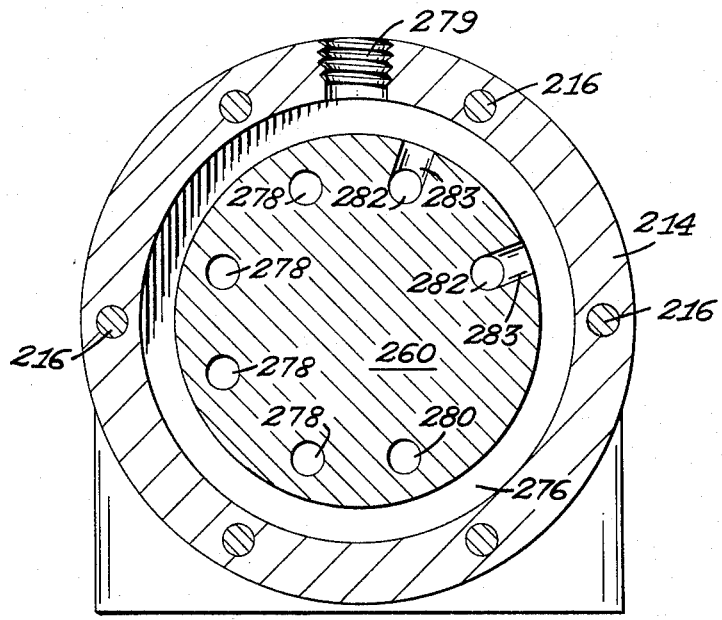
FIG. 14 is a transverse sectional view taken on line 14—14 of FIG. 11.

With reference to FIGS. 5 and 10, the gerotor casing section 104, which in effect is the ring member 104, has a plurality of internal teeth 128. Externally toothed star member 116, having at least one fewer teeth 130 than ring member 104, is disposed eccentrically in the chamber or space formed and surrounded by ring member 104. Star member 116 is moveable orbitally relative to the ring member 104 with axis 118 of star member 116 being moveable in an orbital path about the axis 120 of ring member 104. During orbital movement of star member 116 the teeth 130 thereof intermesh with the ring member teeth 128 to form expanding and contracting cells 132 which are equal in number to the number of teeth 130 of star member 116.

With further reference to FIG. 10, a vertical centerline 140 incidentally represents the line of eccentricity for the star member 116 for that particular position of the star member relative to the ring member 104. During orbital movement of the star member 116, assuming the orbital movement is clockwise, the cells 132 on the left side of the line of eccentricity would be expanding and the cells 132 on the right side would be contracting. In the operation of the device illustrated, fluid under pressure is directed to the expanding cells on the left side of the line of eccentricity and exhausted from the contracting cells on the right side of said line. The valving arrangement which facilitates the feeding and exhausting of the cells 132 will be described further on herein.

A shaft 142, which may be referred to as a dogbone because of its general appearance, extends into valve bore 126 and mechanically connects star 116 and commutator valve 124 in driving relation. Star member 116 has a bore 144 which is concentric relative to the teeth 130 thereof and the bore 144 is provided with a plurality of circumferentially arranged, axially extending teeth or splines 146. The inner end of valve bore 126 is provided with a plurality of circumferentially arranged, axially extending teeth or splines 147. Shaft 142 has an enlarged head 148 at the star end thereof which has a frustospherically shaped portion and is provided with splines which are equal in number to and mesh with splines 146 of the star 116. A spacer spool 150 is disposed in star bore 144 in closely spaced relation with shaft head 148 and end plate 110. The other end of dogbone 142 has an enlarged head 152 with a frustospherically shaped portion and is provided with splines which are equal in number to and mesh with splines 147 of the valve 124.

Star member 116 is eccentrically disposed relative to ring member 104, as mentioned above, and the dogbone shaft 142 is thus always in a cocked or tilted position relative to valve 124, which has the same axis 120 as ring member 104, and to the axis 118 of star member 116. Dogbone shaft 142 is a universal joint type of shaft which functions to cause commutator valve 124 to rotate in synchronism with the rotational movement of star member 16 about its own axis 118. In operation the right end of the dogbone 142 has both orbital and rotational movement in common with the star member 116 while the left end of the dogbone has only rotational movement in common with valve 124. Valve 124 is a commutating type valve in that it rotates at the same speed that star 116 rotates but it functions to supply and exhaust fluid to and from the gerotor at the orbiting frequency of the star.

Thus far only the mechanical aspects of the device illustrated in FIGS. 5 to 10 have been referred to and the fluid flow passages and valving will now be described.

It is a characteristic of the device that it has one fluid inlet port and at least two fluid outlet ports. In the embodiment of the invention illustrated in FIGS. 5 to 10 there is provided one fluid inlet port and three fluid outlet ports. A fluid inlet port 154 and two fluid outlet ports 156 and 158 are provided in casing section 102, each of which ports extend through casing section 102 and open into the bore 122. A third fluid outlet port 160 is provided in end plate 108 which is concentric with the axis 120 and has fluid communication with bore 125 of commutator valve 124.

Figure 9:
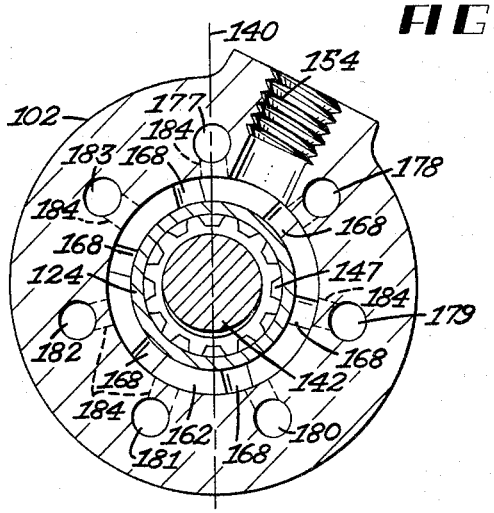
FIG. 9 is a transverse sectional view taken on line 9—9 of FIG. 5.

Commutator valve 124 and casing section 102 are provided with fluid passage means through which fluid is conveyed from the inlet port 154 to the expanding cells 132 of the gerotor and through which fluid being exhausted from the collapsing cells 132 of the gerotor is caused to be divided and flow out of all of the outlet ports 156, 158 and 160. Valve 124 has three axially spaced annular channels 162, 164 and 166 which are axially aligned and in constant fluid communication respectively with fluid inlet port 154 and fluid outlet ports 156 and 158 in casing section 102. With reference to FIGS. 5 and 9, valve 124 has a plurality of axially extending, circumferentially arranged and spaced fluid inlet passages which are illustrated herein as a set of six grooves 168 in the cylindrical surface of valve 124 which are in constant fluid communication with annular channel 162 and inlet port 154.

Figure 6:
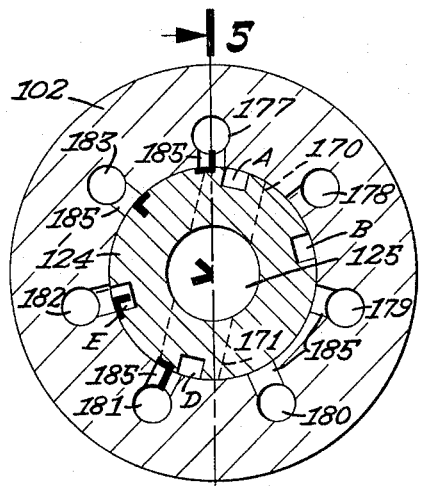
FIG. 6 is a transverse sectional view taken on line 6—6 of FIG. 5.

Valve 124 is also provided with exhaust passages which are illustrated herein as being six passages A, B, C, D, E and F which are equal in number to the number of teeth on the star 116. Passages A to F are in circumferentially spaced relation and are alternately spaced circumferentially relative to feed passages 168. The alternate spacing of the feed passages 168 relative to the exhaust passages A to F may be noted by comparing the sections shown in FIGS. 6 to 9 of the drawings. Passages A to F are in three sets AD, BE and CF. Passages A and D as may be noted in FIGS. 5 and 6 are formed as axially extending channels on diametrically opposite sides of valve 124 and intersect the plane of line 6—6. Passages A and D are connected to fluid outlet 160 through two radially extending slots 170 and 171 in valve 124 which open into valve bore 125.

Figure 7:
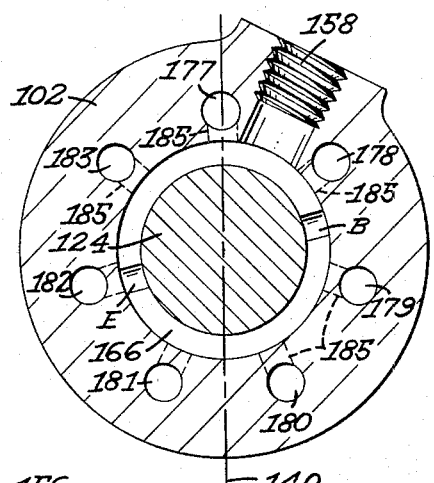
FIG. 7 is a transverse sectional view taken on line 7—7 of FIG. 5.

Passages B and E as may be noted in FIGS. 5, 6 and 7 are formed as axially extending channels on diametrically opposite sides of valve 124 and intersect the plane of the line 6—6 and annular channel 166. Passages B and E are connected to fluid outlet 158 through annular channel 166.

Figure 8:
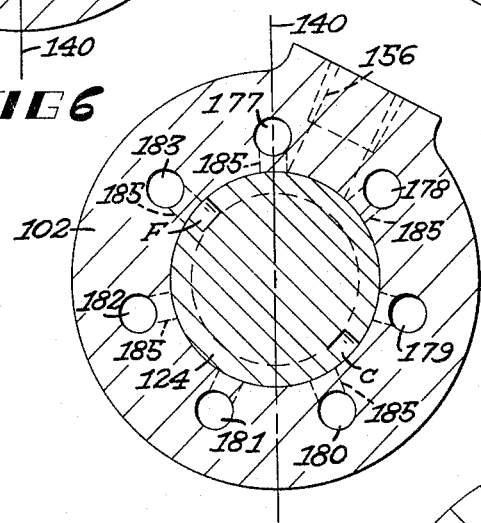
FIG. 8 is a transverse sectional view taken on line 8—8 of FIG. 5.

Passages C and F as may be noted in FIGS. 5 and 8 are formed as axially extending channels on diametrically opposite sides of valve 124 and intersect the plane of line 8—8 and annular channel 164. Passages C and F are connected to fluid outlet 156 through annular channel 164.

Casing section 102 has a plurality of generally axially extending, circumferentially arranged and spaced passages 177 to 183 (see FIGS. 5 to 10) illustrated as being seven in number which is equal to the number of teeth 128 of the ring member 104. The passages 177 to 183 extend axially from points between the ring member teeth 128 in the chamber formed by the ring member 104 through casing section 102. Casing section 102 has a total of fourteen ports which extend radially from passages 177 to 183 to casing bore 122 which provides each one of the passages 177 to 183 with two outlets to the casing bore 122. One set 184 of said ports is axially positioned so as to be registerable with inlet passages 168 and outlet passages C and F upon rotation of valve 124. A second set 185 of said ports is axially positioned so as to be registerable with outlet passages A and D and outlet passages B and E upon rotation of valve 124.

Valve 124, by reason of the dogbone connection between it and star 116, will rotate at the same speed as star 116 but in the opposite direction from the orbiting direction of the star 116. Upon rotation of valve 124, the feed passages 168 of valve 124 register successively in fluid communication with the passages 177 to 183 in casing section 102 through radial ports 184. Exhaust passages A to F register successively in fluid communication with the passages 177 to 183 in casing section 102 with passages A, B, D and E having communication therewith through ports 185 and passages C and F having communication therewith through radial ports 184.

In the operation of the device, pressurized fluid is introduced through inlet port 154 from where it flows into annular channel 162 into inlet passages 168 in valve 124, through radial ports 184 in casing section 102 on the right side of the line of eccentricity 140 as viewed in FIGS. 5 to 9, through passages 178 to 180 in casing section 102 on the right side of the line of eccentricity 140 to gerotor cells 132 on the right side of the line of eccentricity 140. The expansion of the cells 132 on the right side of the line of eccentricity 140 causes star 116 to orbit in a counterclockwise direction and cause collapsing of the cells 132 on the left side of the line of eccentricity 140. Fluid from the collapsing cells 132 flows through casing passages 181 to 183 on the left side of the line of eccentricity 140, through radial ports 185 on the left side of the line of eccentricity to the interior of valve bore 122 where it has fluid communication with fluid exhaust passages D, E and F on the left side of the line of eccentricity.

The above description of fluid flow is only for an instantaneous condition in that the line of eccentricity 140 rotates about the axis 120 of ring member 104 at the orbiting speed of star 116 and it is only in the position illustrated for an instant during each rotation thereof about axis 120. As long as pressurized fluid is admitted through inlet port 154, however, the pressurized fluid will always be admitted to cells on the same side of the line of eccentricity 140, regardless of the angular position of said line relative to axis 120, and fluid will always be exhausted from cells on the other side of said line.

Considering any cell 132 individually, such as the cell connected to passage 182, for example, pressurized fluid is first admitted through passage 182 to cause the cell to expand and subsequently, when the cell collapses, fluid is forced out of cell 132 through the same passage 182 through which the fluid was admitted to the cell.

At the same instant when valve 124 is in the position illustrated, it may be noted from FIGS. 5, 6, 7 and 8 that (1) fluid from passage 183 is being exhausted through valve passage F, through annular channel 164 and out fluid outlet port 156, (2) fluid from passage 182 is being exhausted through valve passage E, through annular channel 166 and out fluid outlet port 158, and (3) fluid from passage 181 is being exhausted through valve passage D, through radial valve passage 171 into valve bore 125 and out fluid outlet port 160. Thus, it will be noted that at that instant each of the cells 132 on the left side of the line of eccentricity 140 is being exhausted to a different outlet port. Different conditions prevail for other positions of star 116 and valve 124 but at any instant there are always three exhaust cells on the exhaust side of the line of eccentricity 140 that are exhausting fluid to the three outlet ports 154, 156 and 158.

When the valve 124 has advanced a few degrees in a clockwise direction from the position shown, the instantaneous flow conditions are such that (1) fluid from passage 183 will be exhausted through valve passage E to fluid outlet port 158, (2) fluid from passage 182 will be exhausted through valve passage D to fluid outlet port 160, and (3) fluid from passage 181 will be exhausted through valve pasage C to fluid outlet port 156. Thus, as distinguished from the first embodiment of the invention, the exhaust from a single cell is not divided as the cell collapses but instead the entire exhaust from one collapsing cell will exhaust through one outlet port. Also, one valve passage of each of the valve pairs AD, BE and CF is always on the opposite side of the line of eccentricity from the other valve passage of each of the pairs so that at all times each of the outlet ports such as outlet port 158 will be supplied by one passage of a pair such as the pair CF except for the instant during each rotation of the line of eccentricity 140 that a pair of passages is in alignment with the line of eccentricity.

From the above description it may be observed that the second embodiment of the invention also operates as a flow divider in that one stream of fluid admitted through inlet port 154 is caused to be divided and exhausted from the device through three outlet ports 156, 158 and 160. In addition to functioning as a flow divider the second embodiment of the invention can also function as a pressure intensifier or pressure multiplier in the same manner as the first embodiment.

The first and second embodiments of the invention have gerotors which operate in conjunction with valves which rotates in synchronism with the rotating speed of the star member of the gerotor. These valves may be referred to as slow speed valves or commutator valves and the valving action by which a slow speed valve feeds fluids to and exhausts fluid from the gerotor may be referred to as commutation.

An explanation of what is meant by the word "commutation" as applied to gerotor type mechanisms is as follows:

Gerotor type mechanisms are well known in the art and in general comprise a pair of inner and outer gears with the inner externally toothed star gear having at least one less tooth than the outer internally toothed ring gear. The star gear is eccentrically mounted relative to the ring gear and there are various combinations wherein the axes of the gears may be fixed relative to each other or there may be relative orbital movement between the axes of the gears. Of the various possible combinations which involve relative orbital movement between the gears, either gear may (1) be stationary, (2) have orbital and rotational movement, (3) have only orbital movement or (4) have only rotational movement.

During any relative movement between the gears, each tooth of each gear has continuous and sequential contact with each tooth of the other gear. The teeth of the two gears intermesh in sealing engagement during relative movement therebetween to form expanding cells on one side of the line of eccentricity which passes through the axes of the gears and contracting cells on the other side of the line of eccentricity.

It is known that when orbiting type gerotors are used for fluid pressure devices such as pumps and motors, the fluid feeding and exhausting of the gerotor must be performed at the orbiting speed of the orbiting gear because each of the cells referred to expands and contracts once during each orbit of the orbiting gear. In older devices a valve was provided which rotated in synchronism with the orbiting of the orbiting gear and fluid passages were provided in the valve which, in general, consisted of fluid feeding passage means on one side of the valve and fluid exhaust passage means on the other side of the valve. This valve may be referred to as a high speed valve because it rotates at the orbital speed of the gerotor unit which is several times faster than the rotational speed of the gerotor unit.

In U.S. Patent 2,821,171 (Re. 25,291), a gerotor type fluid pressure device is disclosed in which a valve is provided that rotates in synchronism with the rotational movement of the orbiting gear. As the rotational speed factor of a gerotor unit is only a fraction of the orbital speed factor, this valve may be referred to as a slow speed valve. Valve passages are provided in the slow speed valve in a unique manner which permits fluid to be supplied and exhausted to and from the gerotor in timed sequences to meet the requirements of the plurality of cells which are formed during each orbiting cycle despite the fact that the rotational speed of the slow speed valve is only a fraction of the orbiting speed of the gerotor unit. In the above mentioned patent the slow speed valve is referred to as operating like a commutator because its fluid feeding and exhausting characteristics in relation to an orbital type gerotor are analogous in some respects to electrical commutation. In this specification and appended claims, therefore, the words "commutation" and "commutator" mean, applied to the field of hydraulics, the particular type of slow speed valve disclosed in said patent and the particular feeding and exhausting characteristics it has in relationship to an orbital type gerotor.

The third embodiment of the invention shown in FIGS. 11 to 16 is also a gerotor type fluid pressure device but it does not operate in accordance with the commutation principle as do the first two embodiments of the invention described above.

In the illustrated third embodiment of the invention there is provided a sectional casing comprising a generally cylindrically shaped gerotor section 212, a cylindrically shaped valving section 214 and an end cover plate 215. These casing sections are held together in axial alignment by a plurality of circumferentially spaced bolts 216.

Gerotor section 212 is a generally annularly shaped ring member which has a plurality of internal teeth 218. An externally toothed star member 220, having at least one fewer teeth 222 than ring member 212, is disposed eccentrically in the chamber or space formed and surrounded by ring member 212. Star member 220 is moveable orbitally relative to the ring member 212, the axis 224 of star member 220 being moveable in an orbital path about the axis 226 of ring member 212. During orbital movement of star member 220 the teeth 222 thereof intermesh with the ring member teeth 18 in sealing engagement to form expanding and contracting cells 228 which are equal in number to the number of star member teeth 222.

Figure 16:
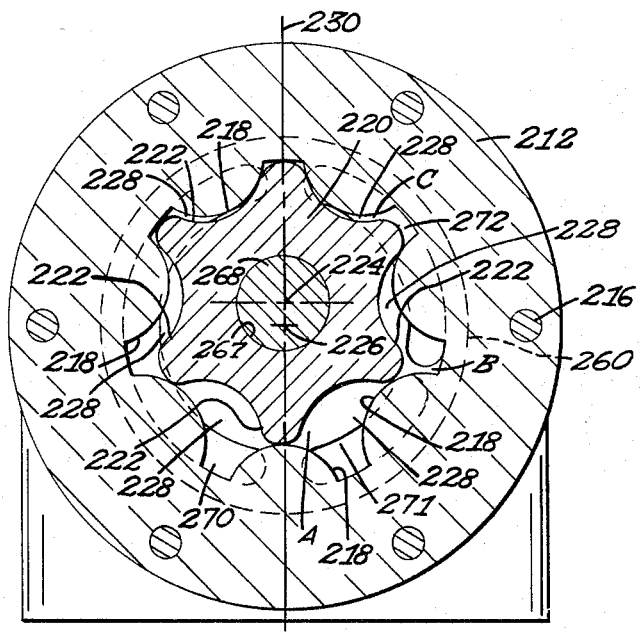
FIG. 16 is a transverse sectional view taken on line 16—16 of FIG. 11.

With reference to FIG. 16, the vertical centerline 230 incidentally represents the line of eccentricity for the star member 220 for that particular position of the star member relative to the ring member 212. During orbital movement of the star member 220, and assuming the orbital movement is clockwise, the cells 228 on the left side of the line of eccentricity would be expanding and the cells 228 on the right side would be contracting. Valving to be described further on facilitates the supplying of fluid under pressure to the expanding cells and the exhausting of fluid from the contracting cells.

The casing valve section 214 has a bore 258 which is concentric relative to the axis or centerline 226 and has cylindrically shaped valve 260 rotatably disposed therein. The diameter of valve 260 is at least as large as the diameter of the gerotor chamber formed by the ring member 212 so that the cells 228 formed between the teeth of the gerotor star and ring members will be closed by the radial face 266 of valve 260 for all orbital positions of star member 220.

Star member 220 has a bore 267 which is concentric relative to the teeth 222 thereof. Valve 260 is provided with an eccentrically disposed shaft portion 268 which is offset from the axis of rotation 226 of the valve 260 a distance equal to the distance that star member 220 is eccentrically offset relative to ring member 212. Shaft portion 268 has the same diameter as star member bore 267 and is rotatably disposed in star bore 267. With this construction the orbiting of star member 220 will cause valve 260 to rotate in the same direction and at the same speed as the orbiting speed of the star member 220 and vice versa.

Figure 15:
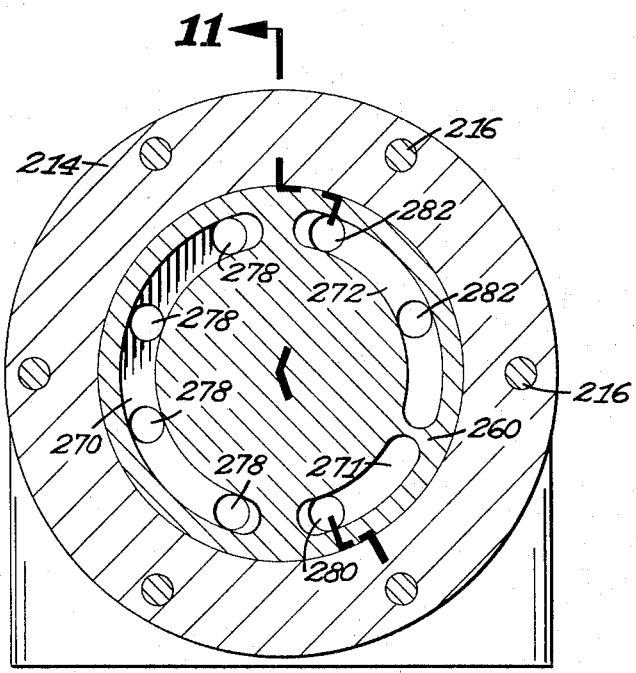
FIG. 15 is a transverse sectional view taken on line 15—15 of FIG. 11.

With reference to FIGS. 15 and 16, the face 266 of valve 260 adjacent star member 220 is provided with three lobes or crescent shaped recesses 270, 271 and 272 with recess 270 being a feed recess on one side of the line of eccentricity 230 and recesses 271 and 272 being exhaust recesses on the other side of said line.

Valve casing 214 has three axially spaced annular channels 274, 275 and 276 which are recessed relative to the casing bore surface 258. Valve casing member 214 has three radially extending ports 277, 278 and 279 which extend from the periphery or outer surface of valve casing 214 and are in respective fluid communication and axial alignement with annular channels 274, 275 and 276. Four circumferentially spaced holes 278 arranged within the confines of feed recess 270 extend axially and are connected by four radially extending holes 279 with annular channel 274 in inlet port 277. A hole 280 arranged within the confines of exhaust recess 271 extends axially and is connected by a radially extending hole 281 with annular channel 275 and outlet port 278. Two circumferentially spaced holes 282 arranged within the confines of exhaust recess 272 extend axially and are connected by two radially extending holes 283 with annular channel 276 and exhaust port 279. Assuming that fluid under pressure is introduced through port 277, the pressurized fluid will flow to annular channel 274, through passages 279 and 278, to feed recess 270 and into the cells 228 on the left side of the line of eccentricity 230. The expansion of the cells 228 on the left side of the line of eccentricity will cause star member 220 to move in an orbital clockwise path. Simultaneously the cells 228 on the right side of the line of eccentricity will be contracting and the fluid therein will flow into recesses 271 and 272 and out of the device through outlet ports 278 and 279. The orbiting of star member 220 causes valve 260 to be rotated through eccentric shaft 268 and valve 260 will rotate at the same speed that star member 220 orbits and in the same direction. Recesses 270, 271 and 272 in valve 260 will thus always rotate in unison with the orbiting of star member 220 and the feed recess 271 will always be on opposite sides of the line of eccentricity from the exhaust recesses 272 and 273.

As the star 220 orbits in a clockwise direction the exhausting cell in the position A (see FIG. 16) will exhaust a substantial portion of the fluid therein into exhaust recess 280 from where it will exhaust through outlet port 278. The remainder of the fluid from that cell will be exhausted therefrom into exhaust recess 272 when the cell reaches the stages of contracting indicated by the cells in the positions B and C. From recess 272 the fluid will be discharged through outlet port 279. It is thus seen that the device functions as a flow divider with the fluid admitted through inlet port 277 and discharged through the two fluid outlet ports 278 and 279.

The device also functions as a pressure intensifier or pressure multiplier. Pressurized fluid fed to the cells on the left side of the line of eccentricity which are expanding produces a resultant force which is effective to orbit the star 220 against the resistance of the fluid being pumped out of the cells on the right side of the line of eccentricity which are contracting. If the two outlets 278 and 279 were open to the atmosphere, the resultant force referred to would simply have the effect of orbiting start 220 at a relatively high speed. If only one of the outlets, such as outlet 279, were open to atmosphere by directing the flow therefrom to a drain reservoir, the total resultant force of the pressurized fluid in the three expanding cells would be concentrated on forcing a portion of the fluid out of a cell 228 when it is in the stage of contraction indicated by the position A and fluid would flow freely out of that cell when it is in the stages of contracting indicated by the positions B and C. Fluid outlet 278 would of course have to be connected to some type of energy absorbing device such as a hydraulic motor which would offer resistance to the flow of fluid from the outlet 278 so that pressure can be developed in the contracting chamber when it is in the position A. The pressure so developed in the cell when it is in the position A will be higher than the pressure of the fluid admitted to the fluid inlet 277.

A still higher pressure could be developed if the device were designed to have three fluid outlet ports and two of the ports were vented to atmosphere and only one of the fluid outlet ports were connected to an energy absorbing device such as a hydraulic motor. In the latter case, however, the volume of fluid delivered to the energy absorbing device will be relatively smaller because proportionately a relatively greater quantity of fluid would then be directed to a reservoir.

The device may also be used as a fluid flow integrator whereby pressurized fluid admitted through fluid "outlet" ports 278 and 279 would be integrated and flow out of "inlet" port 277. The device may also be used as a pump or motor if a power shaft is provided in driving relation relative to the valve 260.

While three embodiment of the invention are described here, it will be understood that other modifications are possible, and that such modifications, including a reversal of parts, may be made without departure from the spirit and scope of the invention as defined in the claims.

What I claim is:

1. In a fluid pressure device, a casing having a fluid inlet port and at least two fluid outlet ports, an internally toothed ring member defining the outer wall of a chamber, a cooperating externally toothed star member having fewer teeth than said ring member disposed eccentrically in said chamber, one of said members having orbital movement about the axis of the other of said members and one of said members having rotational movement about its own axis, the teeth of said members intermeshing to form expanding cells on one side of the line of eccentricity and contracting cells on the other side of said line during relative movement between said members, valve means having a moveable valve part operatively associated with one of said members for movement in synchronism with one of said movements of one of said members, said valve means having fluid supply passage means for admitting fluid from said fluid inlet port to said expanding cells and fluid exhaust passage means for simultaneously and separately exhausting fluid from at least two different contracting cells to at least two different ones of said fluid outlet ports.

2. A fluid pressure device according to claim 1 wherein said moveable valve part is a rotatable valve element connected to said orbital member for rotational movement in synchronism with the orbital movement of said orbital member.

3. A fluid pressure device according to claim 2 wherein said star member has orbital movement about the axis of said ring member.

4. A fluid pressure device in accordance with claim 2 wherein at least a portion of said fluid supply passage means are in said rotatable valve element on one side of said line of eccentricity and at least a portion of said fluid exhaust passage means are in said rotatable valve element on the other side of said line of eccentricity.

5. A fluid pressure device according to claim 1 wherein said moveable valve part is operatively associated with said member having orbital movement.

6. A fluid pressure device according to claim 1 wherein said member having orbital movement about the axis of the other of said members has rotational movement about its own axis at a slower speed than said orbital movement.

7. A fluid pressure device according to claim 6 wherein said moveable valve part is a rotatable valve element connected to said orbital member for rotation in synchronism with said rotational movement of said orbital member.

8. A fluid pressure device according to claim 7 wherein said valve means includes a plurality of circumferentially arranged fluid passages in said casing communicating with said chamber which correspond in number to the number of teeth of said ring member and which communicate with and have a commutating relationship with said fluid supply and exhaust passage means of said rotatable valve element.

9. A fluid pressure device according to claim 8 wherein said fluid supply and exhaust passage means are in said rotatable valve element and comprise a plurality of supply and exhaust passages which are circumferentially arranged with said supply passages being arranged alternately relative to said exhaust passages, said supply passages being in constant fluid communication with said fluid inlet port, said exhaust passages being in constant fluid communication with said fluid outlet ports and at least two of said exhaust passages being separately connected to different ones of said fluid outlet ports.

10. A fluid pressure device according to claim 9 wherein said exhaust passages are formed in groups with at least one group having at least two exhaust passages therein, said groups being in constant fluid communication with said fluid outlet means with said groups being separately connected to different ones of said fluid outlet ports.

11. A fluid pressure device according to claim 10 wherein two exhaust passages in each group are on diametrically opposite sides of said rotatable valve element.

References Cited by the Examiner

UNITED STATES PATENTS

| | | | |
|---|---|---|---|
| Re. 25,126 | 2/1962 | Charlson | 91—56 |
| Re. 25,291 | 12/1962 | Charlson | 91—56 |
| 2,132,812 | 10/1938 | Wahlmark | 103—130 |
| 2,758,573 | 8/1956 | Krozal | 91—56 |
| 2,871,831 | 2/1959 | Patin | 123—8 |
| 2,912,937 | 11/1959 | Insley | 103—130 |
| 2,989,951 | 6/1961 | Charlson | 103—130 |
| 3,215,043 | 11/1965 | Huber | 230—145 |
| 3,233,524 | 2/1966 | Charlson | 91—56 |

MARK NEWMAN, *Primary Examiner.*

W. J. GOODLIN, *Assistant Examiner.*